(12) United States Patent
Lochocki, Jr. et al.

(10) Patent No.: US 9,056,604 B2
(45) Date of Patent: Jun. 16, 2015

(54) FEED-FORWARD ENGINE IDLE SPEED CONTROL

(71) Applicant: GM Global Technology Operations LLC, Detroit, MI (US)

(72) Inventors: Ronald F. Lochocki, Jr., Ypsilanti, MI (US); Krishnendu Kar, South Lyon, MI (US); Colin Hultengren, New Hudson, MI (US); Leon Cribbins, Dexter, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 13/951,921

(22) Filed: Jul. 26, 2013

(65) Prior Publication Data

US 2015/0032345 A1    Jan. 29, 2015

(51) Int. Cl.
*B60W 10/02* (2006.01)
*B60W 10/06* (2006.01)
*B60W 10/11* (2012.01)

(52) U.S. Cl.
CPC ............... *B60W 10/06* (2013.01); *B60W 10/11* (2013.01); *B60W 10/02* (2013.01); *B60W 2510/02* (2013.01); *B60W 2510/0642* (2013.01)

(58) Field of Classification Search
CPC ...... B60W 10/02; B60W 10/06; B60W 10/11
USPC ........... 701/68; 477/167, 171, 173, 181, 185, 477/203
See application file for complete search history.

(56) References Cited

U.S. PATENT DOCUMENTS

| | | | | |
|---|---|---|---|---|
| 2009/0093336 | A1* | 4/2009 | Soliman et al. | 477/5 |
| 2009/0143188 | A1* | 6/2009 | Soliman et al. | 477/5 |
| 2011/0288735 | A1* | 11/2011 | Shelton et al. | 701/68 |

* cited by examiner

*Primary Examiner* — Edwin A Young
(74) *Attorney, Agent, or Firm* — Quinn Law Group, PLLC

(57) ABSTRACT

A vehicle includes an engine, transmission, engine control module (ECM), and transmission control module (TCM). The transmission includes an input member and an input clutch which selectively connects a crankshaft of the engine to the input member. The TCM identifies a target clutch torque of the input clutch during a creep maneuver of the vehicle, and communicates the identified target clutch torque to the ECM. The ECM maintains engine idle speed at a threshold level through the creep maneuver and a requested launch using the target clutch torque as a feed-forward term. A method includes identifying a target clutch torque of the input clutch during a creep maneuver, and communicating the identified target clutch torque to the ECM. The idle speed is maintained at a threshold level by the ECM through the creep maneuver and a detected launch using the target clutch torque as a feed-forward idle speed control term.

17 Claims, 2 Drawing Sheets

FEED-FORWARD ENGINE IDLE SPEED CONTROL

TECHNICAL FIELD

The present disclosure relates to engine idle speed control.

BACKGROUND

A dual clutch transmission (DCT), which combines features of a manual and an automatic transmission, has oddly-numbered and evenly-numbered gears. A first input clutch is applied to engage any oddly-numbered gears such as $1^{st}$, $3^{rd}$, or $5^{th}$ gear. A second input clutch is similarly applied to engage any evenly-numbered gears. One of these input clutches is also engaged when entering reverse. A controller predicts the next gear to be selected using various available control inputs such as engine acceleration and braking levels, and then stages the next gear ahead of the impending shift. This dual input clutch design and advance staging functionality can result in relatively fast gear shifts.

When idling in a vehicle having a DCT, a driver can remove pressure from a brake pedal to allow the vehicle to slowly move or "creep" forward at a threshold rate of speed. Sufficient throttle request added before or during creep results in launch of the vehicle. In order to creep or launch in a vehicle having a DCT, as well as in a vehicle having a manual or an automatic manual transmission (AMT), an input clutch is applied as a designated launch clutch while the engine is idling. Control of clutch pressure during creep/launch is automatically modulated via a controller in the DCT and AMT designs, while a driver's manually-applied clutch apply pressure serves the same function in a manual transmission.

SUMMARY

A vehicle is disclosed herein. The vehicle includes an internal combustion engine, a transmission, an engine control module (ECM), and a transmission control module (TCM). The transmission includes an input member and a launch clutch. The TCM, which is in communication with the ECM, is programmed to execute a control method in conjunction with the ECM during launch or creep maneuvers of the vehicle. Execution of the method is intended to optimize the overall quality and feel of the launch/creep maneuver.

It is recognized herein that application of a launch clutch may impart a significant load on the crankshaft of the engine. In response, engine idle speed can momentarily sag at the start of the creep or launch maneuver. Sag in engine speed, if sufficiently pronounced, can stall the engine at launch. The present invention is intended to address such potential engine sag during the creep and launch maneuvers, specifically by using feed-forward compensation from the TCM to the ECM. In the disclosed approach, the TCM identifies the clutch load and communicates the identified clutch load to the ECM. The ECM then uses the communicated clutch load to maintain engine idle speed at a threshold level through the duration of the creep or launch maneuver.

In particular, a vehicle is disclosed herein having the engine, transmission, ECM, and TCM noted above. The engine includes a crankshaft and has an idle speed. The transmission includes an input member and one or more input clutches that selectively connect the crankshaft to the input member. The TCM is programmed to identify a target clutch torque, with the target clutch torque being the torque capacity required of the input clutch during a creep maneuver of the vehicle. This identified target clutch torque is communicated to the ECM. The ECM is programmed to maintain the idle speed of the engine at a threshold level through the creep maneuver using the identified target clutch torque as a feed-forward engine idle speed control term.

The transmission may be optionally embodied as a dual clutch transmission having, as the input clutch, a first and a second input clutch.

The vehicle may include a brake pedal, the depression of which generates a braking signal. The ECM may detect a threshold braking event via processing of the braking signal, and decrease or ramp down the target clutch torque at a calibrated rate in response to such a threshold braking event.

The vehicle may also include an accelerator pedal, the depression of which generates a throttle request signal. The ECM may detect a launch maneuver of the vehicle via the throttle request signal, and increase or ramp up the target clutch torque at a calibrated rate in response to the detected launch maneuver. The calibrated rate may include multiple calibrated rates, each corresponding to a different threshold throttle request.

Additionally, the TCM may calculate an amount of slip across the input clutch during the launch maneuver. One of the calibrated rates in this instance may correspond to a determined slip across the input clutch that exceeds a calibrated threshold, with this rate being applied when such a threshold slip event occurs. The TCM may decrease the target clutch torque at another of the calibrated rates upon detection by the ECM of a throttle tip-out event.

A system for the above described vehicle includes the transmission and TCM.

A method for controlling the idle speed of the engine is also disclosed. The method includes identifying, via a transmission control module (TCM), a target clutch torque of an input clutch of the vehicle during a creep maneuver, and then communicating the identified target clutch torque to an engine control module (ECM). The method additionally includes maintaining the idle speed of the engine at a threshold level through the creep maneuver using the identified target clutch torque as a feed-forward idle speed control term.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
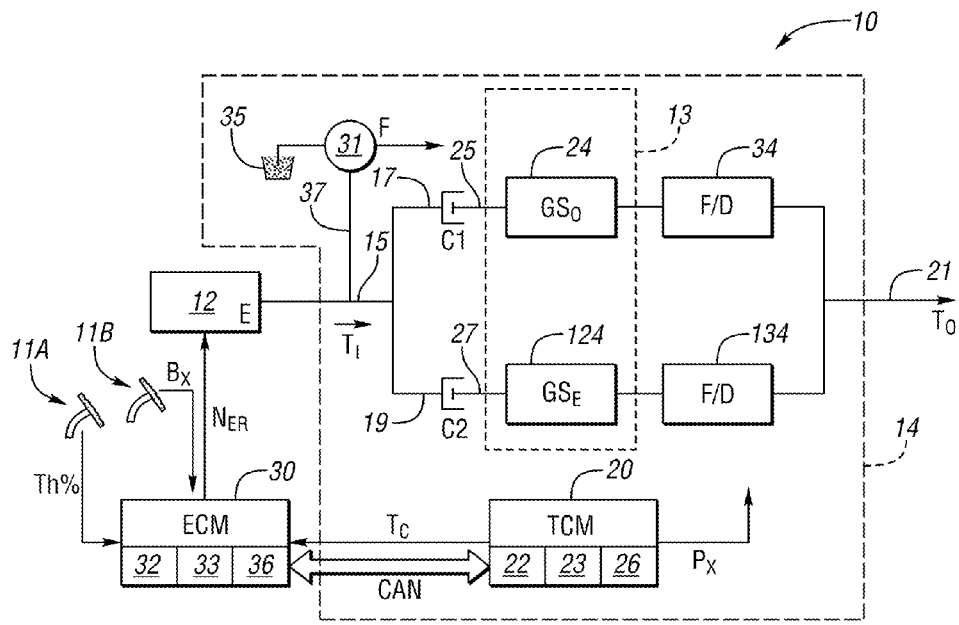
FIG. 1 is a schematic illustration of an example vehicle having a transmission that is controlled during a creep or launch maneuver using the control method set forth herein.

Referring to the drawings, wherein like reference numbers refer to like components throughout the several Figures, a vehicle 10 is shown schematically in FIG. 1. The vehicle 10 includes an internal combustion engine 12 and a transmission 14. The transmission 14 is shown in FIG. 1 as an example dual clutch transmission (DCT) having a pair of input clutches C1 and C2. Other transmission designs having an input clutch as a designated launch clutch, such as manual or automated manual transmissions, may also be used within the scope of the present invention. For illustrative consistency, the example DCT of FIG. 1 will be used hereinafter without limiting the transmission 14 to a DCT configuration.

The vehicle 10 of FIG. 1 includes a control system having a transmission control module (TCM) 20 and an engine control module (ECM) 30. Although omitted from FIG. 1 for simplicity, other control modules may be included as needed. The TCM 20 and the ECM 30 communicate with each other, e.g., over a controller area network (CAN) bus or other suitable network path. The TCM 20 and the ECM 30 are configured, i.e., programmed in software and equipped in hardware, to execute a feed-forward engine idle speed compensation control method 100, an example of which is described below with reference to FIG. 4. Execution of the method 100 is intended to optimize the overall quality and feel of creep and launch maneuvers relative to conventional transmission designs. The method 100 prevents a perceptible sag in engine speed upon application of a launch/creep clutch, such as either of the input clutches C1 or C2 of the example transmission 14 of FIG. 1. The effect of the present method 100 on various vehicle parameters during creep and launch is described in greater detail below with reference to FIGS. 2-4.

The engine 12, which is shown schematically in FIG. 1, is responsive to a received throttle request (arrow Th%). Throttle request (arrow Th%) may be commanded by a driver of the vehicle 10 as a force or a percentage of travel of an accelerator pedal 11A to indicate a relative level of requested engine torque. Such force/travel may be detected via a throttle sensor (not shown) in the conventional manner. In response to receipt of the throttle request (arrow Th%) by the ECM 30, the engine 12 delivers input torque (arrow $T_I$) to an engine crankshaft 15. The input torque (arrow $T_I$) is ultimately transmitted to the transmission 14. Similar force/travel of a brake pedal 11B may be captured as a braking signal (arrow $B_X$) and input to the ECM 30 for use in execution of the method 100, as a release of the brake pedal 11B may signal the start of the creep maneuver, and may also coincide with a requested launch of the vehicle 10.

As is well understood in the art, a DCT of the type shown in FIG. 1 includes a gearbox 13 containing two independently-operated input clutches, i.e., the respective first and second input clutches C1 and C2 of the example vehicle 10. Either input clutch C1 or C2 may be applied as a launch clutch when launching the vehicle 10, for instance applying input clutch C1 when launching from $1^{st}$ gear. While omitted from FIG. 1 for illustrative simplicity, each input clutch C1 and C2 may also include a center plate containing any number of friction discs, friction plates, or other suitable friction materials.

The input clutches C1 and C2 may be lubricated/wet or dry. If lubricated, fluid (arrow F) may be circulated by an engine-driven fluid pump 31 to the input clutches C1, C2, or the fluid (arrow F) may be circulated only to the gearbox 13 in a dry DCT embodiment. Associated electronic and hydraulic clutch control devices (not shown) ultimately control the shift operation and vehicle launch in response to instructions from various onboard controllers as explained in detail below.

In the example transmission 14 of FIG. 1, the first input clutch C1 controls the oddly-numbered gear sets 24 ($GS_O$) of the DCT assembly 14, for instance first, third, fifth, and seventh gears in an example 7-speed transmission, while the second input clutch C2 controls any evenly-numbered gear sets 124 ($GS_E$), e.g., second, fourth, and sixth in the same example 7-speed transmission. Within each of the gear sets 24, 124, additional clutches, typically hydraulic piston-actuated rotating or braking clutches, may be engaged or disengaged as needed to establish the desired gear states. The reverse gear state may be part of the oddly-numbered gear set 24 and controlled via the first input clutch C1. Using this gear arrangement, the transmission 14 can be rapidly shifted through its available range of gears without completely interrupting the power flow from the engine 12.

In the example vehicle 10 of FIG. 1, the transmission 14 also includes an output shaft 21 that is connected to a set of drive wheels (not shown). The output shaft 21 ultimately transmits transmission output torque (arrow $T_O$) to the drive wheels (not shown) to propel the vehicle 10. The transmission 14 may include a first shaft 25 connected to the first input clutch C1, a second shaft 27 connected to the second input clutch C2, and the respective odd and even gear sets 24, 124 ($GS_O$, $GS_E$) located within the gearbox 13, both of which may be cooled and lubricated via circulation of transmission fluid from a sump 35 via an engine-driven main pump 31, e.g., via a pump shaft 37, or alternatively via an auxiliary pump (not shown).

Within the transmission 14, the first shaft 25 is connected to and drives only the oddly-numbered gear sets 24 ($GS_O$). The second shaft 27 is connected to and drives only the evenly-numbered gear sets 124 (GSE), including a reverse gear set. The transmission 14, when constructed as a DCT as shown, further includes upper and lower main shafts 17 and 19, respectively, which are connected to final drive (F/D) gear sets 34, 134. The final drive gear sets 34 and 134 in turn are connected to the output shaft 21 of the transmission 14, and are configured to provide any required final gear reduction.

Still referring to FIG. 1, the TCM 20 and the ECM 30 may be configured as microprocessor-based computer devices having associated hardware elements such as processors 22, 32 and memory 23, 33. The memory 22, 33 may include, but is not necessarily limited to, tangible, non-transitory computer-readable media such as read only memory (ROM), optical memory, solid state flash memory, and the like, as well as random access memory (RAM), electrically-erasable programmable read-only memory (EEPROM), flash memory, etc. The TCM 20 and the ECM 30 may also include circuitry including but not limited to a high-speed clock, analog-to-digital (A/D) circuitry, digital-to-analog (D/A) circuitry, a digital signal processor or DSP, transceivers 26, 36, and the necessary input/output (I/O) devices and other signal conditioning and/or buffer circuitry needed for executing the method 100, which will now be described with reference to the remaining Figures. All associated steps of the method 100 may be programmed into the memory 23 and/or 33 and executed therefrom via the processors 22 and/or 32 as needed. Thus, the term "configured to" as used herein refers to programming and/or otherwise constructing or equipping the TCM 20 and ECM 30 to perform their required functions without further modification.

Figure 2:
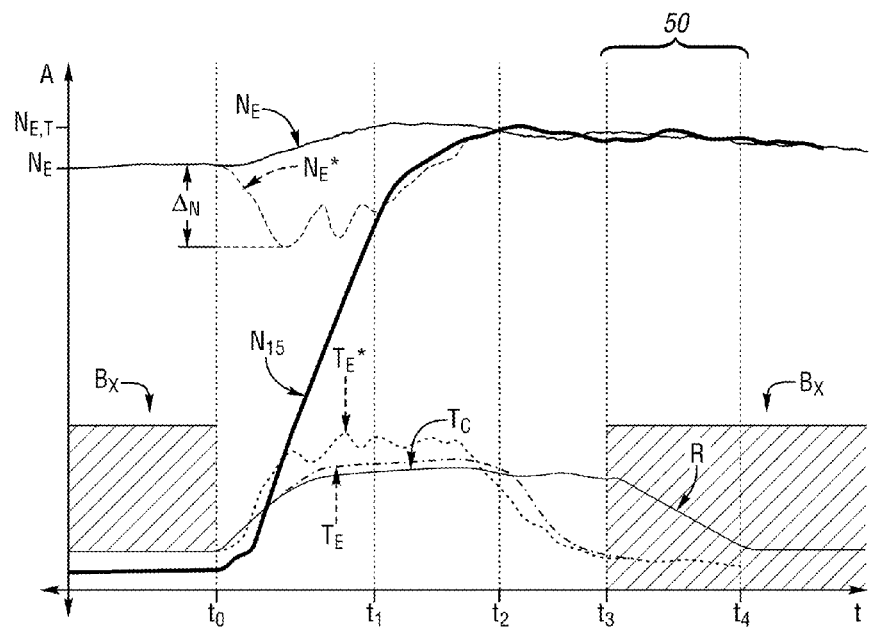
FIG. 2 is a time plot describing a set of parameters of the vehicle shown in FIG. 1, with amplitude and time depicted on the respective vertical and horizontal axes.

Referring to FIG. 2, a time plot 50 describes changing amplitudes (A) of a set of parameters of the vehicle 10 shown in FIG. 1, with the amplitudes plotted on the vertical axis and time (t) plotted on the horizontal axis. Prior to $t_0$, the vehicle 10 of FIG. 1 is at a standstill with the brake pedal 11B of FIG. 1 fully applied and the accelerator pedal 11A fully released. At $t_0$, the driver releases the brake pedal 11B and, as a result, the associated braking signal $B_X$ drops to zero, thereby signaling the start of a creep maneuver and a possible launch. That is, absent a threshold amount of the throttle request (arrow Th%) shown in FIG. 1, the vehicle 10 would only creep forward at a calibrated creep speed, governed via a calibrated maximum creep torque, without launching.

In either case, one of the input clutches C1 or C2 of FIG. 1 is fully applied as a launch clutch. Absent use of the present method 100, this action might result in an immediate sag in engine speed of a magnitude $\Delta N_E$, as indicated by the trajectory of trace $N_E^*$. The sag in engine speed would be sustained until engine torque (trace $T_E^*$) rises sufficiently to increase the shaft torque ($T_S$) acting on the transmission 14 of FIG. 1, e.g., on the shaft 17 when launching in first gear. Therefore, between $t_1$ and $t_2$ engine speed ($N_E^*$) would rise to its target level $N_{E,TGT}$. However, the transient engine sag occurring between $t_0$ and $t_2$ may be perceptible to a driver. The present method 100 seeks to reduce the amplitude and duration of this sag via a specific communication between the TCM 20 and ECM 30 of FIG. 1 using a feed-forward clutch load compensation approach.

Specifically, the TCM 20 shown in FIG. 1 determines the target clutch load ($T_C$) for the designated input clutch as described below with reference to FIG. 3. The target clutch load ($T_C$) is a required torque capacity of the launch clutch, which once again in the example of FIG. 1 is either of the input clutches C1 or C2 depending on the design, with the target clutch load ($T_C$) value communicated by the TCM 20 to the ECM 30.

The ECM 30, upon receipt of the communicated target clutch load ($T_C$), controls idle speed at launch/creep using the received clutch load ($T_C$) as a control parameter. This control action results in a trajectory shown by trace $N_E$. Engine torque (trace $T_E$) is thus effectively smoothed between $t_0$ and $t_2$ as shown relative to engine torque (trace $T_E^*$) determined absent execution of the method 100. The TCM 20 outputs the target clutch load ($T_C$) with a smooth trajectory. In the event of threshold hard braking event while the vehicle 10 is actively creeping, which occurs at $t_3$ in FIG. 2, the TCM 20 takes the additional step of ramping down the target clutch torque ($T_C$) at $t_4$, as indicated by arrow R. This in turn reduces the rate of the sag in engine speed $N_E$.

Figure 3:
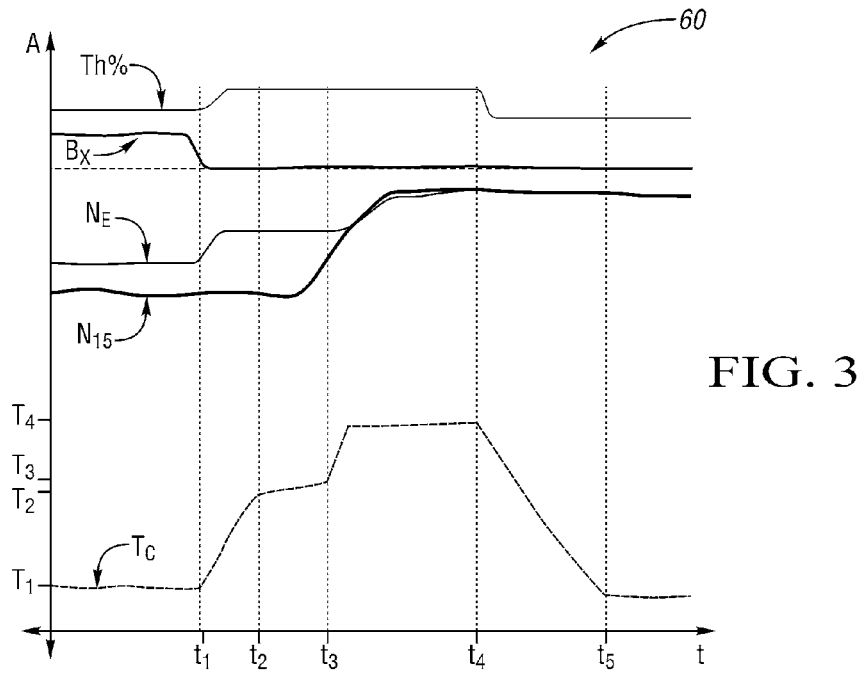
FIG. 3 is another time plot showing feed-forward clutch torque as used in the present control method.

Referring to FIG. 3, the target clutch torque ($T_C$) is described in further detail. As with FIG. 2, when the engine 12 of FIG. 1 is idling, the brake pedal 11B is fully applied and the accelerator pedal 11A is fully released. This occurs between $t_0$ and $t_1$ of FIG. 3. In FIG. 3, all ramp rates between $t_1$ and $t_5$ are based on the level of force/travel of the accelerator pedal 11A, i.e., the level of throttle request, and may be calibrated ahead of time using different threshold force/travel values. The target clutch torque ($T_C$) may be provided with different ramp rates depending on the stage of the launch.

A first rate is shown between $t_1$ and $t_2$, which corresponds to the initial acceleration phase of the launch maneuver. This continues from a first level T1 until a second level T2 is later reached. Here, the first level T1 may be region of 0% or negligible apply to the accelerator pedal 11A of FIG. 1. If in creep mode, the level of T1 may be a calibrated creep torque, i.e., an engine torque value that results in a threshold creep speed, typically less than about 5 kph. Otherwise, the first level T1 may be 0 NM.

At $t_1$, engine speed ($N_E$) begins to rise toward a target level, which is the second level T2, with this target level being equal to a requested axle torque less a calibrated offset. Slightly later, and shortly before $t_3$, the input shaft speed ($N_{15}$) ramps up quickly in response to the feed-forward term, i.e., the clutch torque ($T_C$) provided from the TCM 20. A third level T3 is then reached at $t_3$, with the third level T3 being a calibrated holding axle torque.

The period $t_2$ to $t_3$ represents another phase of the launch maneuver wherein the target clutch torque ($T_C$) is held at a near constant level or increased at a slight ramp rate upward to the third level T3 as shown. As the input shaft speed ($N_{15}$) rises, the slip across the designated launch clutch rises. The TCM 20 commands another relatively fast ramp when the slip exceeds a calibrated slip threshold. A fourth level T4 is then reached, with level T4 being an amount of steady-state torque needed for a threshold non-negligible but minimal amount of slip across the launch clutch, e.g., slip of less than 1-2 RPM. Upon throttle tip-out at $t_4$, the TCM 20 then drops the target clutch torque ($T_C$) back to the first level T1, doing so at a calibrated ramp rate so as to prevent any abrupt changes in output torque (arrow $T_O$ of FIG. 1).

Figure 4:
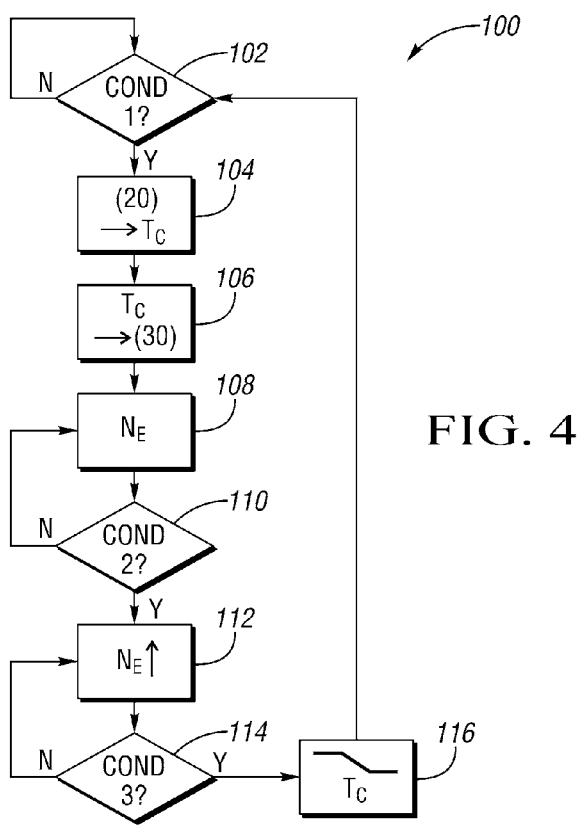
FIG. 4 is a flow chart describing an example embodiment of a feed-forward idle speed compensation control method usable with the vehicle shown in FIG. 1 or other vehicles having an input clutch.

Referring to FIG. 4, an example embodiment of the method 100 begins with step 102, where the TCM 20 of FIG. 1 determines whether certain conditions exist for executing a creep maneuver of the vehicle 10. Step 102 may entail processing the braking signals ($B_X$) and the throttle request (Th%). If these signals indicate that creep of the vehicle 10 is requested, the method 100 proceeds to step 104. Otherwise, step 102 is repeated.

At step 104, the TCM 20 of FIG. 1 next computes the target clutch torque ($T_C$) as the desired clutch capacity for the creep maneuver. By way of example, the target clutch torque ($T_C$) may be calculated as a function of the position of the accelerator pedal 11A, i.e., the driver-requested axle torque. The method 100 proceeds to step 106 once the target clutch torque ($T_C$) is known.

Step 106 entails communicating the target clutch torque ($T_C$) to the ECM 30, such as by transmitting the value of the target clutch torque ($T_C$) to the ECM 30 over the CAN bus of FIG. 1 or any other suitable network path. Once the ECM 30 has received the target clutch torque ($T_C$), the method 100 proceeds to step 108.

At step 108, the ECM 30 of FIG. 1 may set the engine speed target at a level sufficient to creep the vehicle 10 while also maintaining the target clutch torque ($T_C$) previously communicated at step 106. The ECM 30 uses the received target clutch torque ($T_C$) as a feed-forward term, e.g., as part of a proportional-integral-derivative (PID) control loop as understood in the art, to maintain a target idle speed during creep. The method 100 then proceeds to step 110.

At step 110, the TCM 20 and ECM 30 of FIG. 1 together determine whether launch of the vehicle 10 is requested, i.e., by processing the received throttle request (Th%). If so, the method 100 proceeds to step 112. Step 108 is otherwise repeated.

Step 112 entails increasing engine speed, which is indicated as trace $N_E$ in FIG. 3, while adding in the target clutch torque ($T_C$) to compensate for this additional clutch load. The method 100 proceeds to step 114.

At step 114, the method 100 includes determining if the vehicle launch maneuver requested at step 110 is complete. Part of step 114 may include, for example, detecting a threshold hard braking event of the type shown at $t_3$ in FIG. 2, such as by processing the braking levels (arrow $B_X$ of FIG. 1) and comparing these levels, as well as changing vehicle speed, to a calibrated hard braking threshold. If so, the method 100 proceeds to step 116. Otherwise, step 112 is repeated.

Step 116 may include ramping out the target clutch torque ($T_C$) at a calibrated rate. This controlled ramp out rate, which is indicated by arrow R in FIG. 2, helps to prevent a perceptible sag in engine speed, which is an overarching goal of the present method 100. The method 100 is finished after execution of step 116, and may repeat anew starting at step 102.

The underlying logic of the method 100 may be included in any transmission design having an input clutch that is used as a creep/launch clutch. Use of a target input clutch torque capacity or load as a feed-forward term in a PID-based engine idle control scheme, as set forth in detail above, may ultimately reduce or eliminate a perceptible sag in engine speed, specifically during a launch or creep maneuver. These and other potential benefits may be realized, with variations of the example embodiments shown in the various Figures being possible without departing from the intended inventive scope.

The detailed description and the drawings or figures are supportive and descriptive of the invention, but the scope of the invention is intended to be defined solely by the claims. While the best mode, if known, and other embodiments for carrying out the claimed invention have been described in detail, various alternative designs and embodiments exist for practicing the invention defined in the appended claims.

The invention claimed is:

1. A vehicle comprising:
an engine having a crankshaft and an engine idle speed;
an accelerator pedal, the depression of which generates a throttle request signal;
a transmission having an input member and an input clutch, wherein the input clutch selectively connects the crankshaft to the input member during a creep maneuver of the vehicle;
an engine control module (ECM) in communication with the engine; and
a transmission control module (TCM) in communication with the ECM and with the transmission, wherein:
the TCM is programmed to identify a target clutch torque of the input clutch during the creep maneuver of the vehicle, as an engine torque value that results in a threshold creep speed, and to communicate the identified target clutch torque to the ECM;
the ECM is programmed to maintain the engine idle speed at a threshold level through a duration of the creep maneuver using the identified target clutch torque as a feed-forward engine idle speed control term; and
the TCM is further programmed to detect a requested launch maneuver of the vehicle via the throttle request signal, and to increase the target clutch torque at a calibrated rate in response to the detected requested launch maneuver, wherein the calibrated rate results in a speed of the engine that exceeds the threshold creep speed.

2. The vehicle of claim 1, wherein the transmission is a dual clutch transmission having, as the input clutch, a first input clutch and a second input clutch.

3. The vehicle of claim 1, further comprising a brake pedal, the depression of which generates a braking signal, wherein the ECM is programmed to detect a threshold braking event via the braking signal, and to decrease the target clutch torque at a calibrated rate in response to the detected threshold braking event.

4. The vehicle of claim 1, wherein the calibrated rate includes multiple calibrated rates, each of which corresponds to a different threshold throttle request.

5. The vehicle of claim 4, wherein the TCM is configured to calculate an amount of slip across the input clutch during the detected launch maneuver, and wherein one of the multiple calibrated rates corresponds to a calculated amount of slip across the input clutch that exceeds a calibrated slip threshold.

6. The vehicle of claim 5, wherein the TCM decreases the target clutch torque at another of the multiple calibrated rates upon detection by the ECM of a throttle tip-out event.

7. A system for a vehicle having an accelerator pedal operable for generating a throttle request signal, an engine responsive to the throttle request signal, and an engine control module (ECM), the system comprising:
a transmission having an input member and an input clutch that selectively connects a crankshaft of the engine to the input member; and
a transmission control module (TCM) in communication with the ECM and with the input clutch, wherein the TCM is programmed to identify a target clutch torque of the input clutch as an engine torque value that results in a threshold creep speed during a creep maneuver of the vehicle, and to communicate the identified target clutch torque to the ECM as a feed-forward engine idle speed control term, and wherein the TCM is further programmed to detect a requested launch maneuver of the vehicle using the throttle request signal to increase the target clutch torque at a calibrated rate in response to the detected requested launch maneuver, wherein the calibrated rate results in a speed of the engine that exceeds the threshold creep speed.

8. The system of claim 7, wherein the transmission is a dual clutch transmission having, as the input clutch, a first input clutch and a second input clutch.

9. The system of claim 7, wherein the vehicle includes a brake pedal, the depression of which generates a braking signal, and wherein the TCM is programmed to decrease the target clutch torque at a calibrated rate in response to the threshold braking signal exceeding a calibrated hard braking threshold.

10. The system of claim 9, wherein the calibrated rate includes multiple calibrated rates, each of which corresponds to a different threshold throttle request.

11. The system of claim 10, wherein the TCM is programmed to calculate an amount of slip across the input clutch during the requested launch maneuver, and wherein one of the multiple calibrated rates corresponds to a calculated amount of slip across the input clutch that exceeds a calibrated slip threshold.

12. The system of claim 11, wherein the TCM is programmed to drop the target clutch torque at another of the multiple calibrated rates upon detection by the ECM of a throttle tip-out event.

13. A method for controlling idle speed of an engine in a vehicle, the method comprising:
identifying, via a transmission control module (TCM), a target clutch torque of an input clutch of the vehicle as an engine torque value that results in a threshold creep speed during a creep maneuver of the vehicle;
communicating the identified target clutch torque to an engine control module (ECM);
maintaining the idle speed of the engine at a threshold level, via the ECM, through a duration of the creep maneuver using the identified target clutch torque as a feed-forward engine idle speed control term;
detecting a throttle request signal from an accelerator pedal;
detecting a requested launch maneuver of the vehicle via processing of the throttle request signal by one of the TCM and ECM; and
increasing the target clutch torque at a calibrated rate in response to the detected requested launch maneuver, wherein the calibrated rate results in a speed of the engine that exceeds the threshold creep speed.

14. The method of claim 13, further comprising:
generating a braking signal via depression of a brake pedal;
detecting a threshold braking event via processing of the braking signal by one of the TCM and ECM; and decreasing the target clutch torque at a calibrated rate, via the TCM, in response to the detected threshold braking event.

15. The method of claim 14, wherein the calibrated rate includes multiple calibrated rates each corresponding to a different throttle request.

16. The method of claim 15, further comprising:
calculating an amount of slip across the input clutch during the requested launch maneuver; and
increasing the target clutch torque at one of the calibrated rates corresponding to a calculated amount of slip across the input clutch exceeding a calibrated threshold.

17. The method of claim 16, further comprising:
detecting a throttle tip-out event via the ECM; and
decreasing the target clutch torque, via the TCM, at another of the multiple calibrated rates upon detection by the ECM of the throttle tip-out event.

* * * * *